United States Patent [19]

Dreyfuss et al.

[11] 4,136,136

[45] Jan. 23, 1979

[54] GRAFT COPOLYMERS OF HYDROCARBONS AND SMALL RING HETEROCYCLIC COMPOUNDS AND PROCESS FOR THE PREPARATION THEREOF

[75] Inventors: Patricia Dreyfuss, Bath; Joseph P. Kennedy, Akron, both of Ohio

[73] Assignee: The University of Akron, Akron, Ohio

[21] Appl. No.: 695,368

[22] Filed: Jun. 14, 1976

[51] Int. Cl.$^2$ .................. C08L 23/00; C08L 27/00
[52] U.S. Cl. ................ 260/878 R; 260/823; 260/877; 260/879; 260/880 R; 260/884; 260/886; 260/887; 260/888; 260/889; 260/890; 260/892; 260/896; 260/897 A; 260/899; 260/900
[58] Field of Search ............ 260/2 EN, 887, 888, 260/889, 890, 896, 897, 899, 772, 823, 878, 879, 880, 884, 886, 900, 892

[56] References Cited

U.S. PATENT DOCUMENTS

| | | | |
|---|---|---|---|
| 3,824,197 | 7/1974 | Smith et al. | 260/823 |
| 3,928,501 | 12/1975 | Vandenberg | 260/889 |

OTHER PUBLICATIONS

"Ring-Opening Polymerization", K. C. Frisch & S. L. Reegen, Ed., Marcel Dekker, Inc. N. Y. (1969).

Primary Examiner—J. Ziegler
Attorney, Agent, or Firm—Hamilton, Renner & Kenner

[57] ABSTRACT

Disclosed are novel graft copolymers comprising hydrocarbon backbones and polymerized small ring heterocyclic compounds. The backbones are devoid of O, N or S in the main chain and include SBR, polybutadiene, butyl rubber, neoprene, EPDM, EPM, PVC, and the like. The hetero atom of the graft branches may be O, S or N as well as combinations thereof and include compounds such as ethers, formals, lactones, sulfides and amines. The invention also relates to a process for cationic grafting of the heterocyclic monomers from the backbone which includes the steps of: substituting a plurality of halogen groups onto the backbone; charging a reaction vessel with the halogenated backbone and the heterocyclic monomer in the presence of a suitable solvent where necessary; mixing the contents thereof to allow at least a portion of the backbone to dissolve in the monomer; adding a suitable salt, which in the presence of an organic halide, such as the halogenated backbone, will polymerize the heterocyclic compound; agitating the contents of the reaction vessel so as to disperse the salt throughout the contents facilitating polymerization; and finally, terminating polymerization and extracting the graft copolymer from the remaining contents via conventional techniques.

29 Claims, No Drawings

GRAFT COPOLYMERS OF HYDROCARBONS AND SMALL RING HETEROCYCLIC COMPOUNDS AND PROCESS FOR THE PREPARATION THEREOF

BACKGROUND

The present invention relates to graft copolymers containing a halogenated saturated or unsaturated backbone, such as a diene rubber, poly(styrene-co-butadiene) (SBR), butyl rubber, poly(ethylene-co-propylene-co-diene) (EPDM), polyvinylchloride (PVC), polychloroprene (neoprene) and the like, from which are grafted branches of small ring cationically polymerizable heterocyclic compounds such as formals, lactones, amines, sulfides and ethers, particularly tetrahydrofuran (THF). The invention also relates to a process for the cationic preparation of the graft copolymers described herein.

Heretofore, it has not been possible to synthesize well-defined graft products free from gel, degradation, or ill-defined materials and having a predicted microstructure, comprising otherwise incompatible polymers such as PVC and polytetrahydrofuran (PTHF) or butyl rubber or ethylene-propylene rubber and PTHF. Given the incompatability of the polymers, a possible synthesis of a product having both would involve the graft polymerization of THF from a polymer backbone of the olefin. Thus, the backbone must carry a site capable of initiating polymerization of THF or other monomer which is to be grafted therefrom.

A discussion of known cationic initiators for THF is presented in U.S. Pat. No. 3,824,197, which discloses a method for the preparation of a terminally cationically active or living polymer by the known reaction of THF as well as certain prepolymers with a monobasic acid such as trifluoromethane sulfonic acid or derivatives thereof. This patent and related references are, however, directed toward producing a polycationically active polymer, i.e., a linear straight or branched polymer, having terminally active groups capable of initiating the polymerization of THF or entering into various alkylating and acylating reactions. Notwithstanding the recognition of others in the art that certain monobasic acids can initiate polymerization of THF, there are no references known to us which disclose a method for grafting THF and other heterocyclic monomers from a plurality of halogenated sites, rather than terminal sites on an olefinic polymer backbone, otherwise incompatible with polytetrahydrofuran (PTHF).

SUMMARY OF THE INVENTION

It is therefore an object of the present invention to provide novel graft copolymers containing halogenated saturated or unsaturated backbones and graft branches comprising cationically polymerized small ring, heterocyclic compounds, the hetero atoms of which are selected from the group consisting of O, S, N and combinations thereof.

It is another object of the present invention to provide a cationic process for the preparation of the novel graft copolymers disclosed herein.

These and other objects of the present invention will become apparent from the following description and claims.

In general, the graft copolymers of the present invention comprises a backbone derived from a halogenated saturated and unsaturated hydrocarbon polymer which is devoid of oxygen, nitrogen or sulfur in the main chain, such as chlorinated butadiene, chlorinated butadiene-styrene, PVC, chlorinated ethylene-propylene rubber, chlorinated EPDM, neoprene, chlorobutyl and the like, and graft branches comprising polymers of small ring heterocyclic compounds wherein the hetero atoms are selected from the group consisting of O, S, N and combinations thereof.

The novel graft copolymers described herein are prepared by the steps of substituting a plurality of halogen groups onto the backbone followed by charging a reaction vessel with both the halogenated backbone and the heterocyclic monomer in the presence of a suitable solvent where necessary. The two are thereafter mixed to allow some, if not all, of the backbone to dissolve in the monomer at which time a suitable cationic initiator solution is added. The initiator is formed from a soluble salt which, upon reaction with the halogen from the backbone, produces an entity capable of polymerizing THF. Final steps include agitating the contents of the vessel to disperse the initiator solution throughout the contents; terminating the polymerization and extracting the graft copolymer. Alternatively, one may commence preparation by selecting a halogenated backbone and then proceeding with the foregoing steps.

The process disclosed herein is readily controlled to produce well-defined graft products. One of the important features of the process is that it enables one skilled in the art readily to combine polymers such as PVC and PTHF which have been otherwise incompatible or if synthesized via free radical processes, have not been obtained as well-defined products. The product, poly(-vinyl chloride-g-tetrahydrofuran) would be useful as a high impact resin. Also, nonpolar rubbers such as butyl or ethylene-propylene may now be combined with polar rubbers such as PTHF. Such products would be soluble in solvents for either polymer. Another product, poly(butadiene-g-tetrahydrofuran) could be utilized in tread stocks wherein it would be expected to impart better traction between a tire and wet road surfaces. Neoprene grafted with PTHF is expected to find use as an adhesive, the product exhibiting improved adhesion to polar materials. Many other utilities are expected as various graft products are synthesized according to the process set forth herein.

DESCRIPTION OF THE PREFERRED EMBODIMENT

Suitable saturated and unsaturated polymer backbones have been listed hereinabove and generally include nearly all hydrocarbons which are devoid of O, N or S in the main chain. Thus, epoxides, isocyanates, acrylics, nylons, and polysulfides may not be employed. The number average molecular weight of the backbone polymer may range from 500 to about 5,000,000 with 2,500 to 200,000 being preferred. In order for the grafting to proceed, it is necessary for the backbone to contain halogens, preferably Cl or Br, in allylic, benzylic or tertiary positions. If the halogenation is not inherent, e.g., PVC, and an unhalogenated polymer is selected for a desired product, the halogen functionality may be imparted to the polymer backbone by a suitable post-polymerization technique. Generally, chlorination with t-butylhypochlorite or elemental chlorine may be employed for substitution of chlorine upon the backbone. Other halogens such as bromine or iodine may also be employed.

One suitable procedure for halogenation of an unsaturated backbone, e.g., polybutadiene or SBR, with an alkylhypohalite has been set forth in a copending application of our assignee, Ser. No. 611,716, now abandoned. Halogenation via elemental halogens may be readily facilitated by procedures set forth in reference books directed toward organic syntheses. Although halogen functionality on the backbone is necessary to practice the invention disclosed herein, it is to be understood that the particular route selected to impart such functionality is within the skill of those in the art and, as such, is not intended to constitute a portion of the invention.

Suitable cationic initiators which may be employed are those reported in the literature for the polymerization of THF. A comprehensive listing of such compounds is presented in the aforementioned U.S. Pat. No. 3,824,197 to which reference should be made as desired. For the purposes of our work, a suitable cationic initiator would be one which is formed from any soluble salt which, upon reaction with a suitable organic halide compound, produces an entity capable of effecting the polymerization of THF. The organic halide referred to will, in the synthesis of graft copolymers according to the process set forth herein, be the halogenated polymer backbone. Alternatively, alkyl, olefinic, or aryl halides having tertiary, allylic or benzylic halogens, may be present in lieu of the backbone where it is desirable only to evaluate the performance of a particular salt rather than prepare a graft product. So long as the salt, with the organic halide, polymerizes THF, it is believed to be suitable for the process of the present invention. The halide salt which is formed from the cation of the soluble salt and the halogen of the backbone must be less soluble than the salt employed.

Particularly useful in the graft syntheses described herein have been compounds such as the silver salt of trifluoromethanesulfonic acid ($AgOSO_2CF_3$), as well as $AgPF_6$, $AgBF_4$, $AgClO_4$, $AgSbCl_6$, $AgSbF_6$, and $AgAsF_6$. Suitable metals other than silver which could be employed would include cadmium, copper, lead, lithium, mercury, and sodium. For convenience, the salt may be dissolved in a solvent such as THF, dichloromethane or dichloroethylene prior to addition to the reaction vessel.

The monomers utilized to form the novel graft copolymers of the present invention are grafted from the backbone as opposed to being grafted onto or grafted through the backbone. The terminology "grafted from" is indicative of the polymerization wherein a reactive site on the backbone interacts with the monomer and a salt to give a site from which the polymer thereafter continues to grow to a size determined by the number of sites, the amount of monomer and somewhat by the reaction conditions. A more detailed discussion of grafting techniques is presented by J. P. Kennedy, *Recent Advances in Polymer Blends, Grafts and Blocks*, L. H. Sperling Ed., Plenum Press, N.Y., 3, (1974). Number average molecular weight for the graft branches will generally range from about 100 to 200,000 per branch. In terms of weight percent, the branches may account for from about 1 to 99 percent of the weight of the graft copolymer product.

The small ring heterocyclic monomers which may be grafted from the various backbones in which the hetero atom is oxygen include epoxides, ethers, formals and lactones. Similarly, several of the more common cyclic sulfides and amines may be grafted from the various backbones and, it is believed that cationically polymerizable compounds containing combinations of the O, N and S hetero atoms, e.g., lactams, oxathiolanes, thiazole and the like, may also be grafted from the backbones disclosed herein.

A ready listing of suitable heterocyclic compounds which will polymerize and therefore may be employed to form the novel graft copolymers of the present invention may be found in the book *Ring-Opening Polymerization*, K. C. Frisch and S. L. Reegen Ed. Marcel Dekker, Inc., N.Y., 8–9 (1969) (hereinafter referred to as the Ring-Opening Polymerization text).

Regarding suitable cyclic ether monomers, it is reported at page 112 of the Ring-Opening Polymerization text that four and five-membered rings, but not six-membered, e.g., 1,5-epoxides, should polymerize. Additionally, the three-membered rings, as well as some larger than six-membered, are also expected to undergo grafting from the backbones disclosed herein. Included hereinbelow are examples of synthesized copolymers comprising grafts of cyclic ethers having 2, 3 and 4 carbon atoms per ring, the most frequent example being the four carbon species, tetrahydrofuran (THF).

Suitable cyclic formals are also listed in the Ring-Opening Polymerization text at page 164 wherein it is indicated that five-, seven- and eight-membered rings, i.e., those having 3, 5 and 6 carbon atoms per ring, are polymerizable. One in particular, 1,3-dioxolane, a five-membered ring, has been successfully grafted to PVC and neoprene backbones and is also reported hereinbelow.

Suitable cyclic esters or lactones are also discussed and listed in the Ring-Opening Polymerization text at pages 256–9 wherein it is reported that four-, seven- and eight-membered rings always polymerized while less than all five- and six-membered rings polymerized. Thus, it is believed that lactones having 2–6 carbon atoms per ring may be employed herein, with the understanding that known nonpolymerizable five- and six-membered rings are to be excluded. The successful grafting of a seven-membered ring, $\epsilon$-caprolactone from PVC and neoprene back-bones has been reported hereinbelow as exemplary of the grafting of cyclic lactones.

Suitable cyclic sulfides are generally discussed in the Ring-Opening Polymerization text between pages 191–215. Most common are the three- and four-membered rings, particularly the four-membered thietanes an example of which has been reported hereinbelow. It is believed that cyclic sulfides having 5 and 6 carbon atoms per ring could also be employed.

Suitable cyclic amines or alkylenimines are generally limited to ethylenimine, a three-membered, two carbon atom ring which is readily polymerizable and is discussed at pages 219–245 of the Ring-Opening Polymerization text.

It is to be understood that the foregoing discussion of suitable heterocyclic monomers is not intended to be totally inclusive of every monomer capable of being grafted from the various backbones disclosed herein according to the process of the present invention, but is rather indicative of the types of small ring monomers which may be employed. In this respect, monomers having small side chain substituents should not be disregarded; so long as they are known or at least expected to be cationically polymerizable, they could be grafted according to the present invention. And, as mentioned hereinabove, cationically polymerizable known heterocyclic monomers having combinations of O, N and S atoms per ring may also be employed. Also, bicyclics may be grafted as exemplified by the grafting of 7-oxabicyclo[2.2.1]heptane onto PVC and neoprene backbones set forth hereinbelow.

I Grafting of PTHF from Various Backbones

In a typical laboratory synthesis of the novel graft copolymers of the present invention, the procedures employed were as follows:

Tetrahydrofuran was refluxed under nitrogen over sodium or potassium until sodium naphthalene complex turned green (about 24 hrs.), thereafter distilled and stored in Teflon lined capped pop bottles until used. Polymers were thrice dissolved in a suitable solvent, reprecipitated into a nonsolvent before use and were dried in a vacuum oven. Table I presents the solvents and precipitants used for the various polymers.

TABLE I

| Solvents and Precipitants for the Polymers | | |
|---|---|---|
| Polymer | Solvent | Precipitant |
| Chlorinated polybutadiene | heptane | acetone |
| Chlorinated SBR | " | " |
| Polyvinyl chloride | THF | methanol |
| Neoprene | toluene | 95% ethanol |
| Chlorinated EPDM | benzene | acetone |
| Chlorobutyl rubber | heptane | acetone |

Silver trifluoromethane sulfonate ($AgSO_3CF_3$), obtained from Aldrich Chemical Co., was used as received. All experiments were conducted at room temperature in a dry box under dry nitrogen atmosphere.

The preparation of poly(vinyl chloride-g-tetrahydrofuran) is indicative of the several syntheses carried out utilizing a cyclic ether, THF as the heterocyclic monomer.

Geon 109 (5 g) purified by dissolving in THF and precipitating in methanol three times was dissolved in dry THF (100 ml) and 0.13M $AgOSO_2CF_3$ in THF (5 ml) was added. (Geon is a registered trademark of the B. F. Goodrich Co. for a group of PVC polymers). The viscosity of the solution increased slowly. One day later an additional 5 ml of silver salt solution was added. The polymerization was terminated 48 hours after the first silver salt addition by adding methanol. The unreacted THF was evaporated and the resulting polymer film was dried in a vacuum oven at 40° C. to give 6.67 g product which corresponds to an overall composition of 75% PVC and 25% PTHF.

The crude product was found to be completely soluble in dimethylformamide (DMF), 21% soluble in dioxane, and 10% soluble in ethyl acetate. Inasmuch as DMF is not a solvent for PTHF, all the PTHF formed must have been grafted, i.e., pulled into solution by the DMF soluble PVC backbone.

The presence of graft was further demonstrated by the solubility experiments with ethyl acetate and dioxane, solvents for PTHF but nonsolvents for PVC. Thus, ethyl acetate and dioxane extracts of the product described above were shown by infrared spectroscopy to contain both PVC and PTHF. In those instances the soluble PTHF branches pulled the PVC moiety into solution.

The gel permeation chromatogram of the unfractionated polymer (after removal of only the silver salt) had a high molecular weight tail and its maximum was slightly shifted toward lower count (higher molecular weight) relative to the PVC backbone which indicates the absence of appreciable amounts of ungrafted (unreacted) backbone.

The tensile behavior of the PVC-g-PTHF was found to be distinctly different from that of the backbone, i.e., elongation of the graft was greater and the yield point and ultimate tensile strength were about 25% lower than those of the backbone.

Syntheses involving several other polymer backbones and THF are presented in Table II. Solubility studies enabled the weight percent of PTHF in the graft product to be determined.

TABLE II

| Polytetrahydrofuran Grafts From Various Halogenated Polymer Backbones | | | |
|---|---|---|---|
| Polymer | Symbol | Reaction Time (Days) | % PTHF in Crude Product |
| Chlorinated polybutadiene | ClPBd | 2 | 38 |
| Chlorinated SBR | ClPBdSty | 2 | 35 |
| Polyvinylchloride | PVC | 2 | 25 |
| Chlorinated Nordel-1[a] | $Cl_2$EPDM | 3 | 21 |
| Chlorinated Nordel-2[b] | ClEPDM | 1 | 9.3 |
| Neoprene (polychloroprene) | Neoprene | 1 | 34 |
| Chlorobutyl | ClBut | 1 | 14 |

[a]Chlorine introduced by reaction with elemental chlorine
[b]Chlorine introduced by reaction with $(CH_2CO)_2NCl$ In each synthesis, approximately 5 g of polymer was dissolved in purified tetrahydrofuran (50 ml for neoprene, ClPBdSty, and ClBut, 100 ml for ClPBd, PVC, $Cl_2$EPDM, and ClEPDM). Then 5 ml of an 0.13M solution of $AgSO_3CF_3$ in tetrahydrofuran was added. An additional 5 ml of the silver salt solution was added after 1 day to the PVC and $Cl_2$EPDM. The reactions were finally terminated by the addition of a 90 percent by volume solution of THF in distilled water. The resultant products were thereafter dried in an oven for subsequent characterization.

Solvent extraction data was first collected by dissolving both the homopolymers of the reaction, i.e., backbone and PTHF graft, and the products of the attempted grafting reactions. Solvents employed were dioxane, ethyl acetate, heptane, benzene, toluene, THF, 3-pentanone, dimethylformamide, and $CH_2Cl_2$. Data obtained indicated that most of the PTHF had been grafted from the backbone. Graft products, PVC-g-PTHF, $Cl_2$EPDM-g-PTHF and ClBut-g-PTHF were completely soluble in either dimethylformamide or heptane, both of which are nonsolvents for PTHF, thus ruling out the presence of that homopolymer. Also, the percent of insoluble material determined from either solvent was different than the percent of PTHF in the crude product.

For three of the products, ClPBd-g-PTHF, ClPBdSty-g-PTHF and ClEPDM-g-PTHF, the insolubles far exceeded the PTHF content suggesting that much of the backbone is kept out of solution by grafted PTHF. Thus, in these systems the presence of homopolymer cannot be ruled out.

Lacking knowledge of a differentiating solvent for neoprene, i.e., a solvent for neoprene that is not also a solvent for PTHF, conclusions regarding ungrafted PTHF cannot be reached for neoprene-g-PTHF. The absence of unreacted backbone is, however, clearly demonstrated by the ethyl acetate solubility of neoprene-g-PTHF, and the complete dioxane solubility of ClPBd-g-PTHF and ClPBdSty-g-PTHF.

Solubility data alone are insufficient to determine the amount of unreacted backbone for PVC-g-PTHF, Cl$_2$EPDM-g-PTHF, ClEPDM-g-PTHF, or ClBut-g-PTHF inasmuch as the percents soluble do not correlate well with the percents of PTHF obtained from conversions.

presented. The percentage of PTHF in each crude product has been set forth in Table II hereinabove.

TABLE III

Comparison of Solubilities of Homopolymer and Products of Grafting Reactions

| Polymer | Solvent$^a$ | | | | | | | | |
|---|---|---|---|---|---|---|---|---|---|
| | Dioxane | Ethyl Acetate | Heptane | Benzene | Toluene | Tetra-Hydrofuran | 3-Pentanone | Dimethyl-formamide | CH$_2$Cl$_2$ |
| PTHF | s | s | i | s | s | s | s$^b$ | i | s |
| ClPBd | i | i | s | V.sw | — | s | s$^b$ | — | — |
| ClPBd-g-PTHF | s | 7 | 9 | V.sw | — | s | s | — | — |
| ClPBdSty | i | s$^b$ | s | V.sw | — | s | s$^b$ | — | — |
| ClPBdSty-g-PTHF | s | 24$^c$ | 4 | s$^b$ | — | s | s | s$^b$ | — |
| PVC | i | i | — | — | — | s | — | — | — |
| PVC-g-PTHF | 21 | 10 | — | — | — | s | — | s | — |
| Cl$_2$EPDM | i | i | s | s | — | s | i | — | — |
| Cl$_2$EPDM-g-PTHF | 15 | 9 | s | s | — | s | i | — | — |
| ClEPDM | i | i | s | s | — | s | i | — | — |
| ClEPDM-g-PTHF | 59 | 18 | 41 | — | — | s | — | — | s |
| neoprene | s | i | i | s | s | s | — | — | s |
| neoprene-g-PTHF | s | s | i | V.sw | 45 | s | — | — | s |
| ClBut | i | i | s | — | — | s | — | — | — |
| ClBut-g-PTHF | 9 | 3 | s | — | — | s | — | — | — |

$^a$s = 100% soluble; i = insoluble; sw = swollen; V.sw = highly swollen but still insoluble. Usually the amount dissolved did not change significantly after 1 day. The numbers indicate the percentage of the total product that was soluble.
$^b$About a week was required to achieve solubility.
$^c$After 3 days.

Infrared and nmr analyses revealed that even in those instances where material was extracted into solvents for PTHF but nonsolvents for the backbone, the extracts contained both polymers. This indicates that pure homopolymer, if any, was always contaminated with some graft, which was pulled into solution by the soluble moiety, or left behind because of the insoluble component. Such behavior has often been observed with graft copolymers during related investigations conducted in the laboratories of our common Assignee herein, The University of Akron, and reported, e.g., J. P. Kennedy, J. J. Charles and D. L. Davidson, "Recent Advances in Polymer Blends, Grafts and Blocks," L. H. Sperling, Ed., Plenum Press, N.Y., 157 (1974). In all grafts (except neoprene-g-PTHF), the presence of PTHF was evident from the strong infrared ether absorption at about 1115 cm$^{-1}$. Unfortunately, the 1115 cm$^{-1}$ band in PTHF and a similar band in neoprene overlapped and, therefore, infrared analysis was not useful for this graft. However, the proton resonances in the nmr were widely separated and from the integration of the spectrum obtained, a composition of 70 wt % neoprene and 30 wt % PTHF was calculated. This compared quite well with the composition of 66 wt % neoprene and 34 wt % PTHF obtained gravimetrically from the product isolated. (The wt % PTHF in the crude product was calculated on the basis of the increase in weight of the backbone after evaporation of the solvent and, therefore, contains the residual silver salt. The nmr spectrum was run on purified polymer.)

Solvent extraction data obtained has been set forth in Table III wherein various solubilities for the graft PTHF, the backbones, and the crude graft products are presented.

II Grafting Various Heterocyclic Monomers from a PVC Backbone

Polymerizations for these experiments, as well as those which follow in Section III, were conducted at room temperature, in Teflon-lined screw-capped bottles, in a dry box. The backbone was contacted with the monomer by letting the mixture remain in the dry box for four days with occasional shaking. The backbone swelled greatly but did not actually dissolve except in one of the monomers, ε-caprolactone. Following the four-day period, AgPF$_6$ in CH$_2$Cl$_2$ was added to the bottle which was then shaken to disperse the silver salt solution throughout the contents of the bottle. AgPF$_6$, obtained from Alfa Inorganics Ventron, was used as received. The reactions were terminated by adding 1 ml of concentrated ammonium hydroxide.

The charges for each synthesis comprised: 20–30 ml of the desired monomer; approximately 1.5 g of Geon 109; and 1.5 ml of a 0.13 M AgPF$_6$ solution of the salt dissolved in CH$_2$Cl$_2$. In all syntheses, the monomer was first refluxed under N$_2$ over a suitable drying agent for 2–4 hours and then distilled under N$_2$. The monomers were subsequently stored in a dessicator over P$_2$O$_5$ until used. Monomers employed and compositions obtained have been summarized in Table IV which follows. All percentages which follow are by weight.

TABLE IV

Heterocyclic Monomers Grafted From PVC

| Monomer | Vol. Used (ml) | Color During Polymerization | Days Polymerized | % Monomer Reacted | Product Composition (by wt) | |
|---|---|---|---|---|---|---|
| | | | | | % PVC | % Branch |
| propylene oxide | 24 | Yellow Orange | 3 | 1.8 | 81.5 | 18.5 |
| styrene oxide | 28 | Bronze | 3 | 20 | 21.1 | 78.9 |
| ε-caprolactone | 19.5 | Grey almost Black | 3 | 96 | 6.5 | 93.5 |
| dioxolane | 20.5 | Grey | 1.75 | 96 | 8.1 | 91.9 |
| 7-oxabicyclo-[2.2.1] heptane | 22 | Bronze | 3 | 2.7 | 73.2 | 26.8 |

The polymers from dioxolane and 7-oxabicyclo[2.2.1]-heptane were isolated by evaporation and drying in a vacuum oven. Methanol extraction of unreacted monomer was attempted in the experiment with ε-caprolactone but the product solidified on addition of methanol. The product from styrene oxide polymerization was separated into methanol soluble and insoluble fractions prior to evaporation. The yield is based on the sum of the weights of both fractions. As reported in the table, polymerization occurred with each of the monomers. The polymers were characterized by solubility, nmr, and GPC. The results indicate that graft copolymer formed in each instance and that considerable homopolymer also formed with propylene oxide, styrene oxide, and ε-caprolactone.

Each of the methanol insoluble fractions was dissolved in THF and/or CCl$_4$ and filtered through a Celite filtering aid mat for removal of silver salts. The solvents were subsequently evaporated and the polymers were dried in a vacuum oven. Portions of the isolated polymer were utilized for analysis by GPC and nmr spectroscopy. Methanol soluble fractions were also analyzed by nmr.

The polymerization product of propylene oxide, a 3-membered ring cyclic ether, and PVC was found to be 99% soluble in THF and less than 1% soluble in CCl$_4$. By nmr, the soluble portion was found to comprise 7% polypropylene oxide and 93% PVC. PVC is insoluble in CCl$_4$ while polypropylene oxide is soluble; thus, solubility alone would indicate that graft copolymer was formed.

The polymerization product of styrene oxide, another 3-membered ring cyclic ether, and PVC was found to be 73% methanol soluble which fraction was found to contain 100% polymer from styrene oxide by nmr. The methanol insoluble fraction soluble in THF was 97% and nmr analysis revealed approximately a 79% content of PVC and 21% of polystyrene oxide. The methanol insoluble fraction was also largely insoluble in CCl$_4$ and that which did dissolve was polymer from styrene oxide. The GPC trace indicated formation of a graft copolymer with a very small peak corresponding to homopolymer and a main peak shifted slightly to a higher count (49.0) corresponding to the graft product.

The polymerization product of ε-caprolactone and PVC was found to be 61% soluble in THF and largely insoluble in CCl$_4$; the soluble fraction (THF) was homopolymer of ε-caprolactone by nmr. The GPC had three peaks, e.g., one at 58.7, 56 and 48.0 counts.

The polymerization product of dioxolane, a formal, and PVC was found to be 99% solution in THF which alone evidences the formation of a graft copolymer inasmuch as the homopolymer of dioxolane is insoluble in THF and the wt % composition of the product (from Table IV) indicates 91.9% of polydioxolane present. The sample was largely insoluble in CCl$_4$ and the small soluble fraction showed peaks for both PVC and the homopolymer of dioxolane. The GPC tracing revealed a single symmetrical peak having the same maximum as PVC but a somewhat narrower molecular weight distribution.

Finally, the polymerization product of 7-oxabicyclo-[2.2.1]heptane and PVC was found to be 86% soluble in THF and largely insoluble in CCl$_4$ precluding the obtainment of an nmr spectrum. The GPC tracing revealed a single symmetrical peak with the maximum shifted slightly to a higher count (49.0) and having small but definite high and low molecular weight tails, indicative of a graft copolymer.

III Grafting Various Heterocyclic Monomers from a Neoprene Backbone

As stated hereinabove, conditions under which the following experiments were conducted were the same as in the experiments involving the PVC backbone. The charges for the eight syntheses which follow comprised: 15 ml of the desired monomer with the exception of oxetane and thietane as appears in Table V; 1.5 g of neoprene; and 1.5 ml of a 0.13 M AgPF$_6$ solution of the salt dissolved in CH$_2$Cl$_2$.

TABLE V

| | | Heterocyclic Monomers Grafted From Neoprene | | | | |
|---|---|---|---|---|---|---|
| Monomer | Vol. Used (ml) | Color During Polymerization | Days Polymerized | % Monomer Reacted | Product Composition (by wt) | |
| | | | | | % Neoprene | % Branch |
| propylene oxide | 15 | Purple | 3.8 | 58 | 12.7 | 87.3 |
| ε-caprolactone | 15[a] | Dark Purple | 2.7 | 100 | 8.1 | 91.9 |
| dioxolane | 15 | Bronze | 0.8 | 96 | 8.1 | 91.9 |
| 7-oxabicyclo-[2.2.1] heptane | 15 | Purple | 3.8 | 1.4 | 87.3 | 12.6 |
| styrene oxide | 15 | Copper | 3.8 | 58 | 13.6 | 86.3 |
| oxetane | 5[b] | Grey | .04 | 83 | 30.0 | 70.0 |
| thietane | 5[b] | Tan | 3.8 | 3.8 | 88.2 | 11.8 |

[a]methylene chloride (5 ml) was used to dissolve the neoprene prior to addition of the silver salt.
[b]methylene chloride (10 ml) was used to dissolve the neoprene before the monomer was added and dissolved.

Again, similar to the PVC product, the product with neoprene and styrene oxide was separated into two fractions, methanol soluble and insoluble, prior to evaporation. The methanol insoluble fractions were dissolved in THF, and nmr determination of compositions of the THF soluble portion was carried out in CCl$_4$.

The methanol insoluble propylene oxide and neoprene product was found to be 85% soluble in THF and the nmr analysis thereof revealed 50% of neoprene and 50% of polypropylene oxide. Nmr analysis of the methanol soluble portion revealed 100% comonomer product. Some homopolymer of propylene oxide was also formed.

The methanol insoluble styrene oxide and neoprene product was found to be 61% soluble in THF and nmr analysis of that fraction revealed 53% of neoprene and 47% of polystyrene oxide. Nmr analysis of the methanol soluble fraction revealed 100% polystyrene oxide product; and again, some homopolymer was formed.

The product of ε-caprolactone and neoprene consisted of a brittle fraction and a rubbery lump which was found to be 31% soluble in THF. Nmr analysis of the THF soluble fraction revealed 40% of neoprene and 60% of poly(ε-caprolactone), while analysis of the methanol soluble fraction revealed 100% of poly(ε-caprolactone). Some homopolymer ε-caprolactone was also formed. Graft copolymer was believed to have been formed with this monomer, as well as with the cyclic oxides, propylene oxide and styrene oxide, inasmuch as extractions of the products remaining subsequent to removal of the homopolymer contained about 50% of the polymerized cyclic monomer.

The product of dioxolane and neoprene was found to be 41% soluble in THF and consisted of 92% of polymerized dioxolane. Inasmuch as the latter is insoluble in THF, the polydioxolane moiety was pulled into solution by the neoprene. Although the THF soluble fraction was found to be only slightly soluble in CCl$_4$, the soluble portion did contain neoprene and polydioxolane upon nmr analysis.

The product of 7-oxabicyclo[2.2.1]heptane was found to be 79% soluble in THF. Nmr analysis of a CCl$_4$ extract of this fraction revealed 100% neoprene, although this figure is not truly representative inasmuch as the solubility of this fraction in CCl$_4$ was very low.

The product of oxetane and neoprene was found to be 71% soluble in THF and this fraction revealed 42% neoprene and 58% polyoxetane upon nmr analysis. The product was 100% soluble in CH$_2$Cl$_2$ and a fraction extracted by ethyl acetate was also found to contain neoprene and polyoxetane. Based upon the insolubility of neoprene in ethyl acetane, it may be concluded that the graft copolymer was formed.

The product of thietane and neoprene was found to be only 10% soluble in THF and nmr analysis of this fraction revealed 100% neoprene. Neoprene is soluble in THF while the homopolymer of thietane is not. However, after the addition of only 12% polymerized thietane, only 10% of the mixture readily polymerized in THF. Nevertheless, the entire sample readily dissolved in CH$_2$Cl$_2$, a good solvent for both neoprene and the polythietane branch.

IV. Preparation of Graft Copolymers from Chlorobutyl and Bromobutyl Rubbers

Four syntheses were conducted, two with chlorobutyl rubber and two with bromobutyl rubber. In each of the syntheses 5 g of polymer was again dissolved in 50 ml of purified THF; 5 ml of an 0.13M solution of the silver salt in THF was added and the reaction was eventually terminated by the addition of 1 ml of concentrated NH$_4$OH. The same procedure was employed involving room temperature, dry box and nitrogen gas atmosphere. The salts employed were AgPF$_6$ and AgBF$_4$ from Alfa Inorganics (Ventron), each salt being added to the chlorobutyl and the bromobutyl graft experiment. A brief summarization of the syntheses follows in Table VI.

TABLE VI
Polytetrahydrofuran Grafts from Chlorobutyl and Bromobutyl Rubber Backbones

| Polymer | Salt | % PTHF in Crude Product[b] | GPC Maximum Counts[c] |
|---|---|---|---|
| ClBut | AgF$_4$ | 3.4 | 44.5 |
| ClBut | AgPF$_6$ | 13.3 | 44.3 |
| BrBut[a] | AgBF$_4$ | 0 | 43.5 |
| BrBut | AgPF$_6$ | 5.0 | 43.6 |

[a]Bromobutyl rubber
[b]Nmr spectra taken in CCl$_4$
[c]GPC of the graft copolymers were taken on a portion of the whole sample after removal of only the silver salts.

From an analysis of these results it may be concluded that graft products are obtainable using AgPF$_6$ or AgBF$_4$ in conjunction with chlorinated or brominated backbones, although AgPF$_6$ appears to give a higher percentage of PTHF in the graft than AgBF$_4$. GPC results suggest the presence of neither homopolymer nor unreacted backbone, as a single symmetrical peak was obtained for all four products.

V Preparation of Graft Copolymers with Lithium and Sodium Salts

In order to establish that the cationic grafting syntheses reported herein are not solely dependent upon the use of silver salt initiators, the grafting of THF from a PVC backbone was carried out with employment of LiPF$_6$ and NaClO$_4$ as initiators.

The procedure followed was generally as disclosed hereinabove, i.e., room temperature, dry box and nitrogen gas atmosphere. Geon 109 and THF were purified as described hereinabove, while NaClO$_4$ and LiPF$_6$ were used as received (supplied by Matheson, Coleman and Bell and Ozark Mahoning, respectively).

The salts were dissolved in THF to form a 0.13 M solution (0.001828 moles of LiPF$_6$ in 14.0 ml THF; 0.00706 moles of NaClO$_4$ in 55.0 ml THF). Initially, approximately 5 g of PVC was dissolved in 80 ml of THF with occasional shaking while in the dry box. The salt was thereafter added to each bottle, 2 ml of the LiPF$_6$—THF solution which was allowed to polymerize for 2.6 days and 5 ml o the NaClO$_4$—THF solution which was allowed to polymerize for two days. It is to be noted that selection of the solution amounts and polymerization times are not necessarily stated in absolute terms. Thus, while the first polymerization appeared to proceed quite slowly, and a greater amount was therefore selected for the second polymerization, both reactions were probably substantially complete within 4–5 hours. The longer periods employed had been selected somewhat arbitrarily. Polymerizations were again terminated with concentrated ammonium hydroxide. Subsequent analysis revealed 13% PTHF in the products of both runs.

GPC analysis of both products revealed a symmetrical peak with the curve of each trace being shifted to a higher count, smaller size. Without further characterization, it may be concluded from these peaks that no homopolymer had formed.

The products were also extracted with CCl$_4$. Inasmuch as CCl$_4$ is a solvent for PTHF and a nonsolvent for PVC, any homopolymer that formed should have been extracted from PVC and any graft copolymer. Both extractions were conducted on a small scale (60 mg polymer/1.5 ml CCl$_4$) and the resulting solutions were filtered into nmr tubes. As little of the material dissolved, very high amplification was required for the nmr spectroscopy. The product formed by addition of the sodium salt indicated no evidence of PTHF while the product formed by addition of the lithium salt did indicate weak PTHF peaks. From integration of the data an approximate composition of 37% PTHF and 63% PVC was calculated for the lithium salt initiated product, eliminating the possibility of homo PTHF formation.

Infrared spectra on films cast from THF were compared with films cast from PVC and PTHF. The spectra obtained from the grafts, particularly in the 900–1110 cm$^{-1}$ region where strong absorptions due to PTHF occur, could only be accounted for by the assumption that both PVC and PTHF were present in the film. Insofar as the presence of homo PTHF was eliminated as a possibility, the copolymers were concluded to be grafts.

In conclusion, the syntheses disclosed hereinabove establish that most cationically polymerizable heterocyclic monomers can be grafted from saturated and unsaturated hydrocarbon backbones provided the backbone carry reactive halogen groups and be devoid of O, N or S in the main chain. Polymerization may be initiated according to the present invention by employing a soluble salt having an anion capable of stabilizing an onium ion and a cation whose halide is less soluble in the reaction medium than the original salt.

Thus, it can be seen that the disclosed invention carries out the objects of the invention set forth above. As will be apparent to those skilled in the art, properties of the novel graft copolymers can be varied by selection of the resultant molecular weight and composition of the product, and it is believed that the preparation of these can be obtained without departing from the spirit of the invention herein disclosed and described, the scope of the invention being limited solely by the scope of the attached claims.

We claim:

1. A graft copolymer product comprising:
   a halogenated backbone selected from the group consisting of saturated and unsaturated polymers devoid of oxygen, sulfur and nitrogen in the main chain; and
   a plurality of graft branches of polymer from an unhalogenated cationically polymerizable heterocyclic compound selected from the group consisting of cyclic ethers having three-, four-, five-, seven- and larger membered rings; cyclic formals having five-, seven- and eight-membered rings; cyclic lactones having from four-to-and-eight-membered rings; cyclic sulfides having three-, four-, six- and seven-membered rings; cyclic amines having three-membered rings and bicylic compounds.

2. A graft copolymer, as set forth in claim 1, wherein said backbone polymers are selected from the group consisting of chlorinated polybutadiene, chlorinated butadienestyrene copolymer, PVC, chlorinated EPM, chlorinated EPDM, neoprene, chlorobutyl rubber and brombutyl rubber;
   wherein the number average molecular weight of said backbone polymer ranges from about 500 to 5,000,000;
   wherein the number average molecular weight of said branches accounts for about 1 to 99 weight percent of said copolymer.

3. A graft copolymer, as set forth in claim 2, wherein said backbone polymer is selected from the group consisting of PVC and neoprene and said graft branch is polypropylene oxide.

4. A graft copolymer, as set forth in claim 2, wherein said backbone polymer is selected from the group consisting of PVC and neoprene and said graft branch in PTHF.

5. A graft copolymer, as set forth in claim 2, wherein said backbone polymer is selected from the group consisting of PVC and neoprene and said graft branch is polystyrene oxide.

6. A graft copolymer, as set forth in claim 2, wherein said backbone polymer is selected from the group consisting of PVC and neoprene and said graft branch is poly(ε-caprolactone).

7. A graft copolymer, as set forth in claim 2, wherein said backbone polymer is selected from the group consisting of PVC and neoprene and said graft branch is polydioxolane.

8. A graft copolymer, as set forth in claim 2, wherein said backbone polymer is selected from the group consisting of PVC and neoprene and said graft branch is poly(7-oxabicyclo[2.2.1]heptane).

9. A graft copolymer, as set forth in claim 2, wherein said backbone polymer is selected from the group consisting of PVC and neoprene and said graft branch is polyoxetane.

10. A graft copolymer, as set forth in claim 2, wherein said backbone polymer is selected from the group consisting of PVC and neoprene and said graft branch is polythietane.

11. A graft copolymer product comprising:
    a halogenated polymer backbone selected from the group consisting of chlorinated polybutadiene, chlorinated butadiene-styrene copolymer, chlorinated EPM, chlorinated EPDM, neoprene, chlorobutyl rubber and bromobutyl rubber; and
    at least one graft branch of small ring unhalogenated cationically polymerizable heterocyclic and bicyclic compounds wherein the hetero atoms are selected from the group consisting of oxygen, surfur and nitrogen.

12. A graft copolymer, as set forth in claim 11, wherein the number-average molecular weight of said backbone polymer ranges from about 500 to 5,000,000;
    wherein said heterocyclic compounds are selected from the group consisting of cyclic ethers having three-, four-, five-, seven- and higher membered rings; cyclic formals having five-, seven- and eight-membered rings; cyclic lactones having from four- to eight-membered rings; cyclic sulfides having three-, four-, six-, and seven-membered rings, cyclic amines having three-membered rings and bicyclic compounds;
    wherein the number-average molecular weight of said branches ranges from about 100 to 200,000 per branch; and
    wherein said branches account for about 1 to 99 weight percent of the weight of said copolymer.

13. A graft copolymer, as set forth in claim 12, wherein said backbone polymer is chlorinated butadiene and said graft branch is PTHF.

14. A graft copolymer, as set forth in claim 12, wherein said backbone polymer is chlorinated butadiene-styrene copolymer and said graft branch is PTHF.

15. A graft copolymer, as set forth in claim 12, wherein said backbone polymer is PVC and said graft branch is PTHF.

16. A graft copolymer, as set forth in claim 12, wherein said backbone polymer is neoprene and said graft branch is PTHF.

17. A graft copolymer, as set forth in claim 12, wherein said backbone polymer is chlorinated EPDM and said graft branch is PTHF.

18. A graft copolymer, as set forth in claim 12, wherein said backbone polymer is chlorobutyl rubber and said graft branch is PTHF.

19. A graft copolymer, as set forth in claim 12, wherein said backbone polymer is bromobutyl rubber and said graft branch is PTHF.

20. A process for the cationic preparation of graft copolymers from an unsaturated polyhydrocarbon backbone and unhalogenated cationically polymerizable small ring heterocyclic compounds grafted therefrom comprising the steps of:
    substituting a plurality of halogen groups onto said backbone;
    charging a reaction vessel with said backbone carrying said halogen groups and said heterocyclic compound to be grafted therefrom;
    mixing the contents of said reaction vessel until at least a portion of said backbone dissolves in said heterocyclic compound;

adding a suitable salt formed from a cation selected from the group consisting of silver, cadmium, lead, lithium, mercury, and sodium; and an anion selected from the goup consisting of $CF_3SO_3^-$, $PF_6^-$, $ClO_4^-$, $BF_4^-$, $SbCl_6^-$, $SbF_6^-$, and $AsF_6^-$;

agitating the contents of the reaction vessel so as to disperse said salt throughout the contents whereby said heterocyclic compound is polymerized from said backbone; and thereafter terminating the reaction and extracting the graft copolymer from the remaining contents of said reaction vessel.

21. A process, as set forth in claim 20, wherein said backbone is selected from the group consisting of polybutadiene, SBR, EPM, EPDM rubber and butyl rubber.

22. A process, as set forth in claim 21, wherein said small ring heterocyclic compound is selected from the group consisting of cyclic ethers having three-, four-, five-, seven- and higher membered rings; cyclic formals having five-, seven- and eight-membered rings; cyclic lactones having from four- to eight-membered rings; cyclic sulfides having three-, four-, six- and seven-membered rings, cyclic amines having three-membered rings and bicyclic compounds.

23. A process, as set forth in claim 22, wherein said cyclic ether is selected from the group consisting of propylene oxide, oxetane, THF and styrene oxide;
wherein said cyclic lactone is ε-caprolactone;
wherein said cyclic sulfide is thietane;
wherein said cyclic amine is ethyleneimine; and
wherein said bicyclic compound is 7-oxabicyclo[2.2.1]-heptane.

24. A process, as set forth in claim 20 wherein the number average molecular weight of said backbone is from about 500 to 5,000,000;
wherein the number average molecular weight of said branches ranges from about 100 to 200,000 per branch; and
wherein said branches account for about 1 to 99 weight percent of the weight of said copolymer.

25. A process for the cationic preparation of graft copolymers from a halogenated polyhydrocarbon backbone an unhalogenated cationically polymerizable small ring heterocyclic compounds grafted therefrom comprising the steps of:

charging a reaction vessel with said halogenated backbone and said heterocyclic compound to be grafted therefrom;

mixing the contents of said reaction vessel until at least a portion of said halogenated backbone dissolves in said heterocyclic compound;

adding a suitable salt formed from a cation selected from the group consisting of silver, cadmium, lead, lithium, mercury, and sodium; and an anion selected from the group consisting of $CF_3SO_3^-$, $PF_6^-$, $ClO_4^-$, $BF_4^-$, $SbCl_6^-$, $SbF_6^-$, and $AsF_6^-$;

agitating the contents of the reaction vessel so as to disperse said salt throughout the contents whereby said heterocyclic compound is polymerized from said halogenated backbone; and thereafter terminating the reaction and extracting the graft copolymer from the remaining contents of said reaction vessel.

26. A process, as set forth in claim 25, wherein said halogenated backbone is selected from the group consisting of PVC, chlorinated polybutadiene, chlorinated SBR, chlorinated EPM, chlorinated EPDM, chlorinated butyl rubber, and brominated butyl rubber.

27. A process, as set forth in claim 26, wherein said small ring heterocyclic compound is selected from the group consisting of cyclic ethers having three-, four-, five-, seven- and higher membered rings; cyclic formals having five-, seven- and eight-membered rings; cyclic lactones having from four- to eight-membered rings; cyclic sulfides having three-, four-, six- and seven-membered rings; cyclic amines having three- membered rings and bicyclic compounds.

28. A process, as set forth in claim 27, wherein said cyclic ether is selected from the group consisting of propylene oxide, oxetane, THF and sytrene oxide;
wherein said cyclic lactone is ε-caprolactone;
wherein said cyclic sulfide is thietane;
wherein said cyclic amine is ethyleneimine; and
wherein said bicyclic compound is 7-oxabicyclo[2.2.1]-heptane.

29. A process, as set forth in claim 25, wherein the number average molecular weight of said halogenated backbone is from about 500 to 5,000,000;
wherein the number average molecular weight of said branches ranges from about 100 to 200,000 per branch; and
wherein said branches account for about 1 to 99 weight percent of the weight of said copolymer.

* * * * *

UNITED STATES PATENT OFFICE
CERTIFICATE OF CORRECTION

PATENT NO. : 4,136,136
DATED : January 23, 1979
INVENTOR(S) : Patricia Dreyfuss and Joseph P. Kennedy It is certified that error appears in the above–identified patent and that said Letters Patent are hereby corrected as shown below:

In every instance throughout this patent, the terms "co" and "g" appear in normal print but should have been italicized or underlined.

Column 3, line 59, "weight" should read -- weights --.

Column 4, line 42, delete hyphen in "back-bones".

Column 7, Table III, "$Cl_{2E}PDM$" should read -- $Cl_2EPDM$ --.

Column 11, line 48, "$AgF_4$" should read -- $AgBF_4$ --.

Column 12, line 18, "o" should read -- of --.

Column 13, line 25, "four-to-and-eight" should read -- four- to eight- --; line 34, "brombutyl" should read -- bromobutyl --; line 47, "in" should read -- is --.

Column 14, line 14, "surfur" should read -- sulfur --.

Signed and Sealed this

Twenty-second Day of May 1979

[SEAL]

Attest:

RUTH C. MASON
*Attesting Officer*

DONALD W. BANNER
*Commissioner of Patents and Trademarks*